United States Patent
Cherami et al.

(10) Patent No.: US 11,530,018 B2
(45) Date of Patent: Dec. 20, 2022

(54) SUBSEA INSPECTION VEHICLE

(71) Applicant: Oceaneering International, Inc., Houston, TX (US)

(72) Inventors: Jami Joseph Cherami, Lafayette, LA (US); David Chapman, Houston, TX (US); Chiun-Hong Chien, Houston, TX (US); Sara Rayburn, Lafayette, LA (US)

(73) Assignee: Oceaneering International, Inc., Houston, TX (US)

(*) Notice: Subject to any disclaimer, the term of this patent is extended or adjusted under 35 U.S.C. 154(b) by 891 days.

(21) Appl. No.: 16/289,355

(22) Filed: Feb. 28, 2019

(65) Prior Publication Data

US 2019/0263491 A1    Aug. 29, 2019

Related U.S. Application Data

(60) Provisional application No. 62/636,541, filed on Feb. 28, 2018.

(51) Int. Cl.

| *B63G 8/00* | (2006.01) |
|---|---|
| *B63C 11/48* | (2006.01) |
| *G05D 1/10* | (2006.01) |
| *B63G 8/38* | (2006.01) |
| *B63G 8/08* | (2006.01) |

(52) U.S. Cl.
CPC ............ *B63G 8/001* (2013.01); *B63C 11/48* (2013.01); *B63G 8/38* (2013.01); *G05D 1/10* (2013.01); *B63G 8/08* (2013.01); *B63G 2008/004* (2013.01)

(58) Field of Classification Search
CPC . B63G 8/001; B63G 8/38; B63G 8/08; B63G 2208/004; B63C 11/48; G05D 1/10; G05D 1/048
See application file for complete search history.

(56) References Cited

U.S. PATENT DOCUMENTS

| 5,857,648 A * | 1/1999 | Dailey | B64G 1/22 244/172.6 |
|---|---|---|---|
| 2010/0042357 A1* | 2/2010 | McCoy, Jr. | B25J 9/1694 702/141 |
| 2013/0239869 A1* | 9/2013 | Hesse | B63G 8/20 362/477 |
| 2014/0230713 A1* | 8/2014 | Kimura | B63C 11/52 114/313 |
| 2018/0079476 A1* | 3/2018 | Abdellatif | G01N 29/265 |
| 2018/0290717 A1* | 10/2018 | Byrd | C23F 13/22 |

* cited by examiner

*Primary Examiner* — James M Mcpherson
*Assistant Examiner* — Kyle J Kingsland
(74) *Attorney, Agent, or Firm* — Maze IP Law, P.C.

(57) ABSTRACT

A subsea vehicle capable of supporting inspection of underwater objects while underway includes a body that provides a capability to allow the subsea vehicle to submerge underwater and follow or position near an object while maintaining an orientation to the object appropriate for inspection of, and safety requirements for, the object. The vehicle includes a set of deployable, semi-rigid arms to support the movement of inspection sensor probes near or lightly touching the inspection target with the probes. A controller helps tracks the intended inspection object using various sensor inputs along with a priori knowledge of the object to drive and position the subsea vehicle such that the appropriate orientation to the inspection target is maintained.

14 Claims, 3 Drawing Sheets

SUBSEA INSPECTION VEHICLE

RELATION TO OTHER APPLICATIONS

This application claims priority through U.S. Provisional Application 62/636,541 filed on 28 Feb. 2018.

BACKGROUND

Subsea inspection often utilizes manned vehicles or divers to perform the required inspections. However, these have costs and limitations associated with them. Currently, a vessel with a remotely operated vehicle (ROV) has to deploy the ROV down to a subsea structure such as a pipeline and then sail along the pipeline route while the ROV "flies" over the subsea structure while making visual and non-destructive examinations (NDE) of the subsea structure. This is expensive because it requires an entire ship, ship crew, ROV, at ROV crew at day rates which may be in excess of 200,000 USD per day in day rates. It also uses an enormous amount of fuel to sail the entire vessel. Using an automated underwater vehicle (AUV) would be advantageous because it can be dropped off at a platform or other offshore structure and track the structure autonomously, with no requirement for a crew or vessel.

FIGURES

Various figures are included herein which illustrate aspects of embodiments of the disclosed inventions.

DESCRIPTION OF EXEMPLARY EMBODIMENTS

Figure 1:
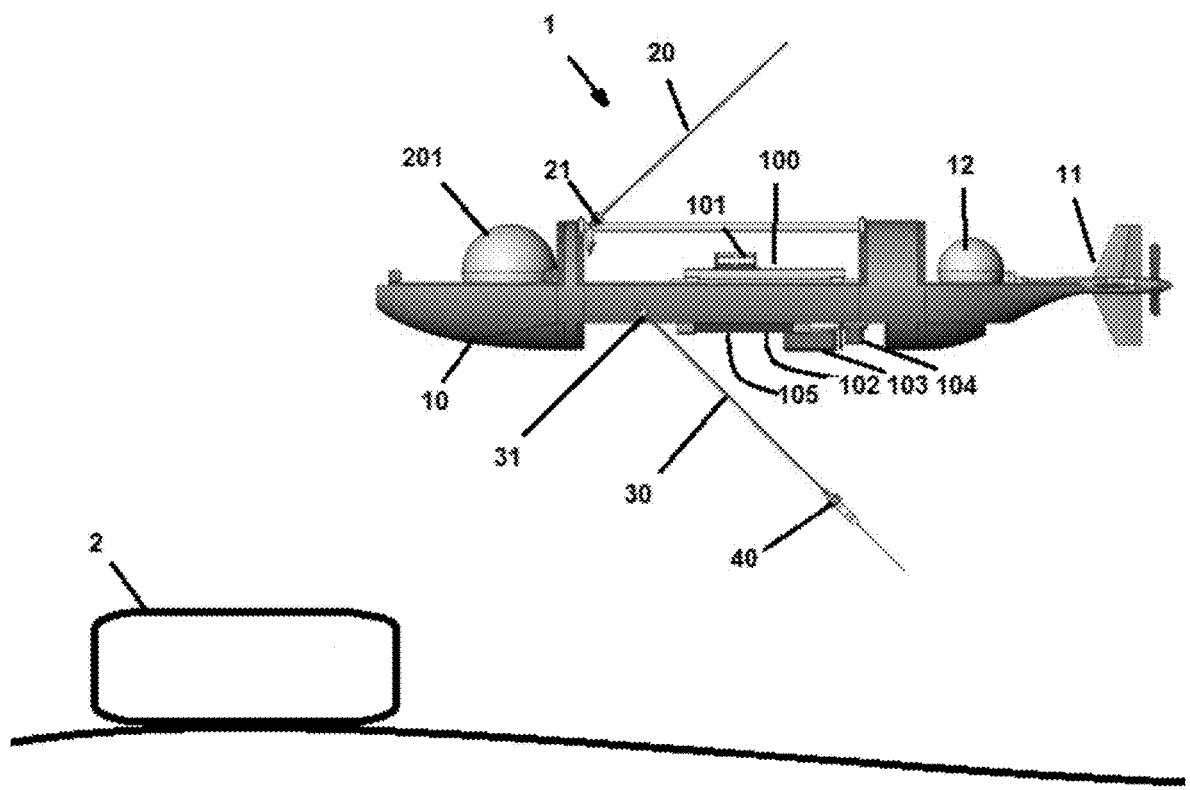
FIG. 1 is a side view in partial perspective of an exemplary subsea vehicle.

In a first embodiment, referring generally to FIG. 1, subsea vehicle 1 is used to help support inspection of one or more underwater objects 2 and navigates and positions itself proximate a desired underwater object 2 using an autonomous navigation process while underway subsea. Subsea vehicle 1 typically comprises body 10; one or more selectively movable inspection sensor probes 20; a set of deployable semi-rigid arms 30; arm actuator 31 (FIG. 3) operatively connected to the set of deployable semi-rigid arms 30; one or more position sensors 40 which are adapted to sense a position of inspection sensor probe 20 relative to body 10 and disposed at a distal end of deployable semi-rigid arm 30; and controller 100. As used herein, intended subsea inspection object 2 may be a subsea pipeline or a subsea tree or the like.

Figure 3:
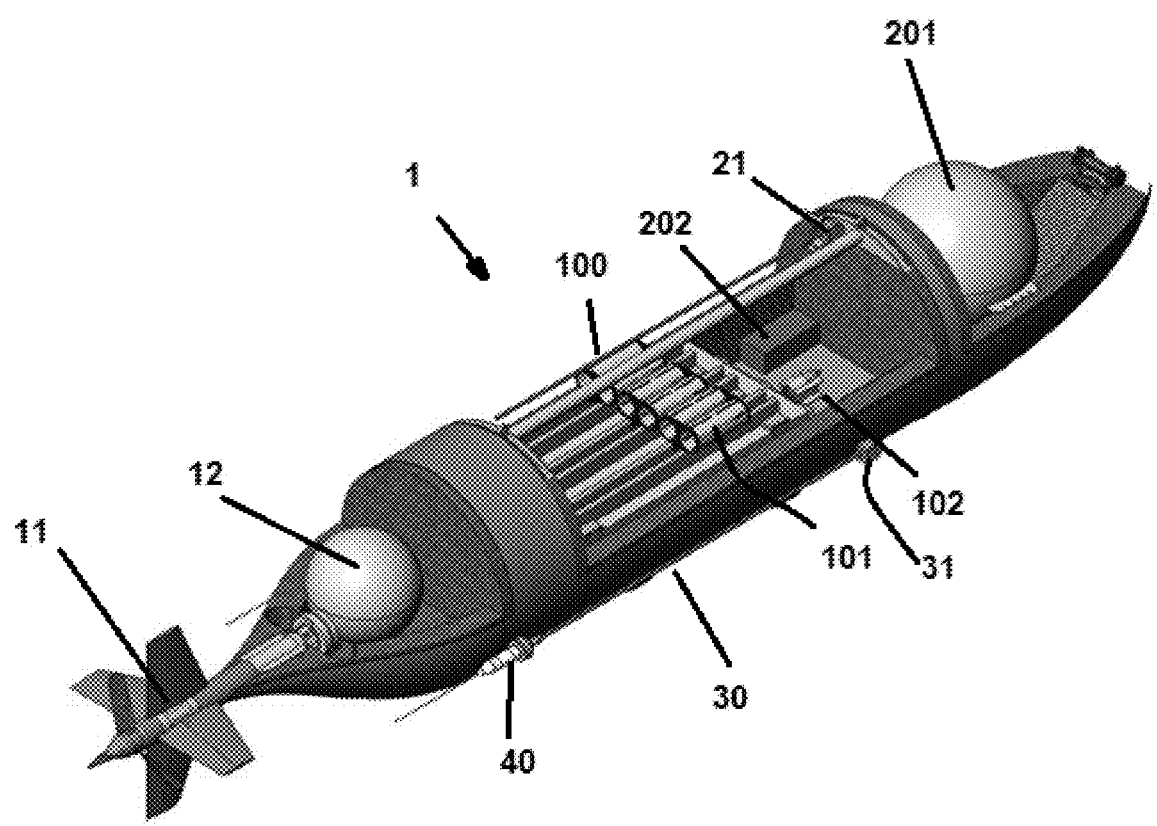
FIG. 3 is a top view in partial perspective of the exemplary subsea vehicle.
Figure 4:
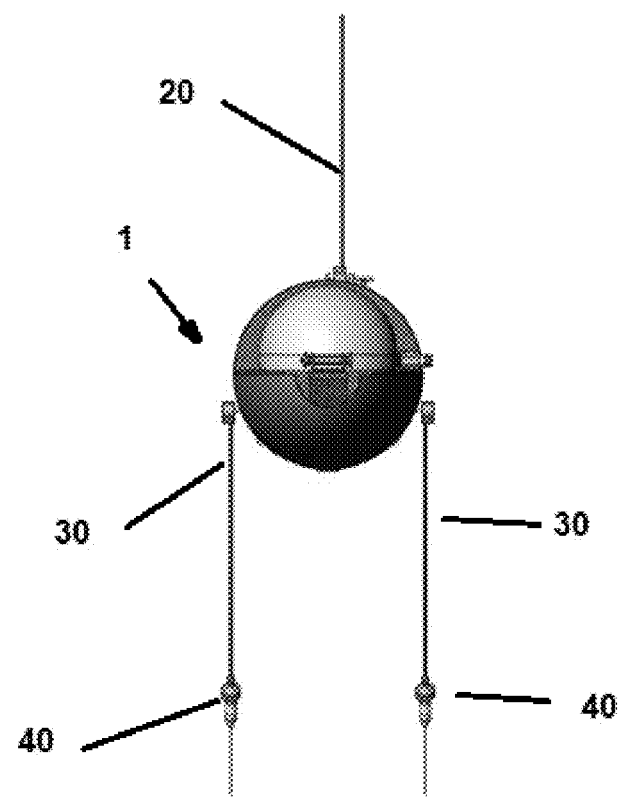
FIG. 4 is a front view in partial perspective of the exemplary subsea vehicle.

Body 10 typically comprises one or more propulsion systems 11 (FIG. 3) and navigator 12 (FIG. 3) which is operatively in communication with propulsion system 11 which may comprise a motor and a propeller, as illustrated in FIG. 3.

Figure 2:
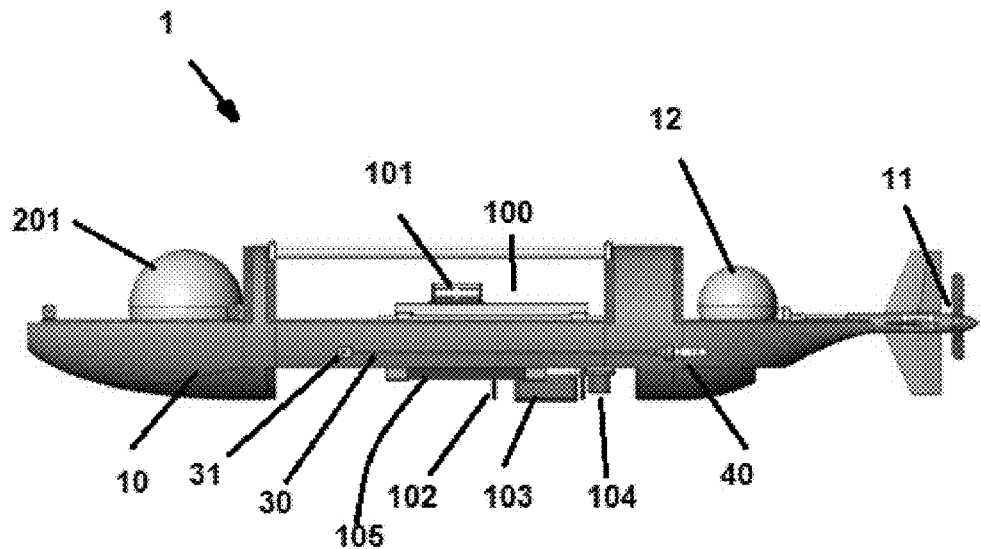
FIG. 2 is a further side view in partial perspective of the exemplary subsea vehicle.

As illustrated in FIG. 2, sensor probes 20 and deployable semi-rigid arms 30 may be selectively moved from a position close to body 10 or as illustrated in FIG. 1 to a position away from body 10 such as by using inspection sensor probe actuator 21 to move its associated sensor probe 20 and by using arm actuator 31 to move its associated deployable semi-rigid arm 30.

Position sensor 40 could be any sensor capable of detecting intended subsea inspection object 2 such as a sonar sensor, a magnetometer, an optical sensor, a lidar sensor, or the like, or a combination thereof.

Controller 100 is operatively in communication with position sensors 40, navigator 12, and arm actuators 31 (FIG. 3) and may comprise a microprocessor and associated memory which do not need to be illustrated for one of ordinary skill to understand the claimed invention. Typically, controller 100 is adapted to track and autonomously navigate to intended subsea inspection object 2 using data from position sensors 40 along with a priori knowledge of the intended subsea inspection object 2 which has been supplied to controller 100. Controller 100 typically issues one or more commands to navigator 12 to drive and position subsea vehicle 1 subsea such that an appropriate orientation of subsea vehicle 1 to the intended subsea inspection object 2, and distance between subsea vehicle 1 and the intended subsea inspection object 2, is maintained which is appropriate for inspection of intended subsea inspection object 2. The orientation and distance may further be influenced by safety requirements of the intended subsea inspection object 2. In certain embodiments, one or more transducers 103-105 may be present and used to help with position sensors 40 and/or inspection sensor probes. By way of example and not limitation, transducers 103-105 may be optical sensors such as still cameras or video cameras, cathodic protection probes, x-ray transducers, ultrasound (UT) sensors, or magnetic flux sensors, or the like, and can be used to perform surveys of subsea inspection object 2.

Each deployable semi-rigid arm 30 is operatively connected to one or more arm actuators 31 which are adapted to move deployable semi-rigid arm 30 and its associated position sensor 40 away from inspection sensor probe 20 when the inspection sensor probe 20 is located near the intended subsea inspection object 2 should the inspection sensor probe 20 be needed for an inspection process. Arm actuators 31 are further configured to support an orientation of deployable semi-rigid arms 30 operatively connected to arm actuators 31.

In certain embodiments, inspection data gatherer 201 is present and operatively in communication with inspection sensor probe 20 via an interface to inspection sensor probe 20. Inspection data gatherer 201 typically comprises a data processor, e.g. processor and memory and data transceiver illustrated as unit 202, to provide data to and receive data from an external data receiver (not shown in the figures). In other embodiments, controller 100 is operatively in communication with inspection sensor probe 20 via the interface to inspection sensor probe 20.

In certain embodiments, power may be supplied to subsea vehicle 1 by batteries 101 which may comprise or otherwise be associated with battery pressure compensators.

In certain embodiments, sensor control bottles 102 may be present and associated with sensor 20.

In the operation of exemplary methods, referring back to FIG. 1, subsea vehicle 1, which is as described above, may be used to support inspection of underwater objects 2 by deploying subsea vehicle 1 using controller 100 by supplying controller 100 with spatial knowledge of intended inspection object 2 useful for autonomous subsea navigation. Once supplied, controller 100 is used to navigate subsea vehicle 1 to a position subsea proximate intended inspection object 2. In doing so, controller 100 may issue one or more commands to navigator 12 such as to submerge subsea vehicle 1 underwater and/or to autonomously command subsea vehicle 1 to follow a path subsea defined by a traversal of subsea vehicle 1 subsea from its current position to intended subsea inspection object 2.

Once proximate intended subsea inspection object 2, controller 100 typically initiates a positioning process by issuing one or more commands to navigator 12 to position the subsea vehicle 1 near intended subsea inspection object 2. Navigator 12 then selectively controls propulsion system 11, which typically comprises a propeller, to maintain a desired orientation of subsea vehicle 1 with respect to inspection target object 2. The positioning process may further comprise controller 100 issuing one or more commands to deploy position sensor 40 such as by moving its associated deployable semi-rigid arm 30 using arm actuator 31 and gather data representative of a current position subsea of subsea vehicle 1 relative to inspection target object 2 from position sensor 40. Position sensor 40 is typically used to detect the position of inspection target object 2 so subsea vehicle 1 can stay above inspection target object 2 while "flying" or "swimming."

In addition, inspection sensor probe 20 may be deployed by using its associated arm actuator 31 to a position suitably located to gather data in support of inspection requirements associated with inspection target object 2 and data then gathered, e.g. by controller 100 or inspection data gatherer 201. The position subsea of subsea vehicle 1 relative to inspection target object 2 may comprise a location where inspection sensor probe 20 is close to or lightly touching inspection target object 2.

Controller 100 typically then uses the data representative of the current position subsea of subsea vehicle 1 relative to inspection target object 2 issue one or more commands to navigator 12 to maintain the orientation of subsea vehicle 1 with respect to inspection target object 2 while inspection data are being gathered.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A subsea vehicle for supporting inspection of underwater objects while underway, comprising:
   a. a body, comprising:
      i. a propulsion system;
      ii. a navigator operatively in communication with the propulsion system;
   b. an inspection sensor probe, adapted to function when proximate to an underwater structure or when touching an underwater structure;
   c. an inspection sensor probe actuator, the inspector sensor probe movably connected to the inspector sensor probe actuator;
   d. a set of independent, separate deployable semi-rigid arms;
   e. a set of arm actuators operatively connected to the set of deployable semi-rigid arms, each arm actuator of the predetermined set of arm actuators associated with a corresponding deployable semi-rigid arm of the set of independent, separate deployable semi-rigid arms;
   f. a position sensor adapted to sense a position of the inspection sensor probe relative to the body, the position sensor disposed at a distal end of its associated deployable semi-rigid arm; and
   g. a controller operatively in communication with the position sensor, the arm actuator, and the navigator.

2. The subsea vehicle for supporting inspection of underwater objects while underway of claim 1, wherein the propulsion system comprises a motor and a propeller operatively connected to the motor.

3. The subsea vehicle for supporting inspection of underwater objects while underway of claim 1, wherein the controller is further adapted to issue a command to the navigator to cause the subsea vehicle to submerge underwater.

4. The subsea vehicle for supporting inspection of underwater objects while underway of claim 1, wherein the controller is further adapted to issue a command to the navigator to cause the subsea vehicle to follow a path subsea defined by a current location of the subsea vehicle subsea and an intended subsea inspection object.

5. The subsea vehicle for supporting inspection of underwater objects while underway of claim 4, wherein the controller is further adapted to issue a command to the navigator to position the subsea vehicle near the intended subsea inspection object.

6. The subsea vehicle for supporting inspection of underwater objects while underway of claim 4, wherein the intended subsea inspection object comprises a subsea pipeline or a subsea tree.

7. The subsea vehicle for supporting inspection of underwater objects while underway of claim 4, wherein the arm actuator is adapted to provide and support an orientation of the position sensor away from the inspection sensor probe when the inspection sensor probe is located near the intended subsea inspection object when the inspection sensor probe be needed for an inspection process.

8. The subsea vehicle for supporting inspection of underwater objects while underway of claim 1, further comprising an inspection data gatherer operatively in communication with the inspection sensor probe via an interface to the inspection sensor probe.

9. The subsea vehicle for supporting inspection of underwater objects while underway of claim 1, wherein the controller is operatively in communication with the inspection sensor probe via an interface to the inspection sensor probe.

10. A method of using a subsea vehicle for supporting inspection of underwater objects while underway, comprising:
    a. deploying a subsea vehicle for supporting inspection of an underwater object while underway underwater, the subsea vehicle comprising:
       i. a body, comprising:
          1. a propulsion system;
          2. a navigator operatively in communication with the propulsion system;
       ii. an inspection sensor probe;
       iii. a set of independent, separate deployable semi-rigid arms adapted to support movement of the inspection sensor probe;
       iv. an inspection sensor probe actuator operatively connected to the inspection sensor probe;
       v. a set of arm actuators operatively connected to the set of deployable semi-rigid arms, each arm actuator of the predetermined set of arm actuators associated with a corresponding deployable semi-rigid arm of the set of independent, separate deployable semi-rigid arms;
       vi. a position sensor adapted to sense a position of the inspection sensor probe relative to the body, the sensor disposed at a distal end of a predetermined deployable semi-rigid arm of the set of independent, separate deployable semi-rigid arms; and vii. a controller operatively in communication with the position sensor and the navigator;

b. supplying the controller with data describing a spatial location of an intended inspection object located subsea;

c. using the controller to navigate the subsea vehicle to a position subsea proximate the intended inspection object;

d. once at the position, using the controller to initiate a position process to maintain an orientation of the subsea vehicle with respect to the intended inspection object, the position process comprising:

i. using an arm actuator of the predetermined set of arm actuators to deploy the position sensor by moving its associated deployable semi-rigid arm to a position close to or away from the body;

ii. gathering data representative of a position subsea of the subsea vehicle relative to the intended inspection object from the position sensor;

iii. deploying the inspection sensor probe to a position which is suitably located to gather data in support of inspection requirements of the intended inspection object from the inspection sensor probe; and iv. using the data representative of the position subsea of the subsea vehicle relative to the intended inspection object to maintain the orientation of the subsea vehicle with respect to the intended inspection object.

11. The method of claim 10, wherein the position subsea of the subsea vehicle relative to the intended inspection object comprises a location where the inspection sensor probe is touching the inspection target.

12. The method of claim 10, further comprising:

a. using the controller to track the intended subsea inspection object by using data from the position sensor along with the supplied a priori knowledge of the intended subsea inspection object to determine a current spatial location of the subsea vehicle; and b. using the controller to issue a command to the navigator to drive and position the subsea vehicle such that an appropriate orientation of the subsea vehicle to the intended subsea inspection object which is appropriate for inspection of the intended subsea inspection object is maintained.

13. The method of claim 12, further comprising using the controller to issue a command to the navigator to drive and position the subsea vehicle such that an appropriate orientation of the subsea vehicle is maintained relative to the intended subsea inspection object which is appropriate for safety requirements of the intended subsea inspection object.

14. The method of claim 12, wherein deploying the position sensor comprises extending the deployable semi-rigid arm with its associated position sensor from the body or retracting the deployable semi-rigid arm back to the body by actuating its associated arm actuator.

* * * * *